(12) United States Patent
Mizuno et al.

(10) Patent No.: US 12,173,169 B2
(45) Date of Patent: Dec. 24, 2024

(54) WATER-BASED INK, PRINTED RECORDING MEDIUM, INKJET RECORDING METHOD, INKJET RECORDING DEVICE, AND INK STORAGE CONTAINER

(71) Applicant: BROTHER KOGYO KABUSHIKI KAISHA, Nagoya (JP)

(72) Inventors: Nao Mizuno, Nagoya (JP); Makito Iguchi, Nagoya (JP); Masato Isogai, Obu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 189 days.

(21) Appl. No.: 18/059,454

(22) Filed: Nov. 29, 2022

(65) Prior Publication Data
US 2023/0167317 A1 Jun. 1, 2023

(30) Foreign Application Priority Data

Dec. 1, 2021 (JP) .................................. 2021-195235

(51) Int. Cl.
*C09D 11/32* (2014.01)
*C09D 11/38* (2014.01)
(52) U.S. Cl.
CPC .............. *C09D 11/32* (2013.01); *C09D 11/38* (2013.01)
(58) Field of Classification Search
CPC ........ C09D 11/32; C09D 11/38; C09D 11/322
See application file for complete search history.

(56) References Cited

U.S. PATENT DOCUMENTS

| 5,609,671 A | 3/1997 | Nagasawa |
| 2008/0241398 A1 | 10/2008 | Kato et al. |
| 2014/0292912 A1 | 10/2014 | Satoh et al. |
| 2020/0086639 A1 | 3/2020 | Morikawa et al. |
| 2020/0262213 A1 | 8/2020 | Kuno et al. |

FOREIGN PATENT DOCUMENTS

| JP | H08-3498 A | 1/1996 |
| JP | 2000513396 A | 10/2000 |
| JP | 2002036599 A | 2/2002 |

(Continued)

*Primary Examiner* — Sharon Polk
(74) *Attorney, Agent, or Firm* — Element IP, PLC

(57) ABSTRACT

A water-based ink includes water, a colorant, and a water-soluble organic solvent. The water-soluble organic solvent includes a penetrating agent and a wetting agent. The penetrating agent includes a compound of formula (1), and the wetting agent comprises a compound of formula (2). In formula (1), x is 4 or more, and y is 2 or more, in formula (2), x is 2 or more. An amount of the compound of formula (1) relative to a total mass of the water-based ink is preferably 0.1 to 2.0 mass %. An amount of the compound of formula (2) relative to a total mass of the water-based ink is preferably 1.0 to 10.0 mass %.

$$H-(CH_2)_x-O-(CH_2CHO)_y-H \quad \substack{CH_3} \tag{1}$$

$$H-(O-C_3H_6)_x-OH \tag{2}$$

18 Claims, 1 Drawing Sheet

(56) References Cited

FOREIGN PATENT DOCUMENTS

| | | | |
|---|---|---|---|
| JP | 2008524400 A | 7/2008 | |
| JP | 2008246821 A | 10/2008 | |
| JP | 2009515007 A | 4/2009 | |
| JP | 2009533526 A | 9/2009 | |
| JP | 2011515535 A | 5/2011 | |
| JP | 2014208474 A | 11/2014 | |
| JP | 2018030984 A * | 3/2018 | ............... B41J 2/01 |
| JP | 2020044679 A | 3/2020 | |
| JP | 2020131576 A | 8/2020 | |
| JP | 2022125036 A * | 8/2022 | ......... B41J 11/0015 |
| WO | WO-9748769 A1 | 12/1997 | |
| WO | WO-2006066132 A2 | 6/2006 | |
| WO | WO-2006066132 A3 | 6/2006 | |
| WO | WO-2007053564 A2 | 5/2007 | |
| WO | WO-2007053564 A3 | 5/2007 | |
| WO | WO-2007120703 A2 | 10/2007 | |
| WO | WO-2007120703 A3 | 10/2007 | |
| WO | WO-2009117071 A1 | 9/2009 | |

* cited by examiner

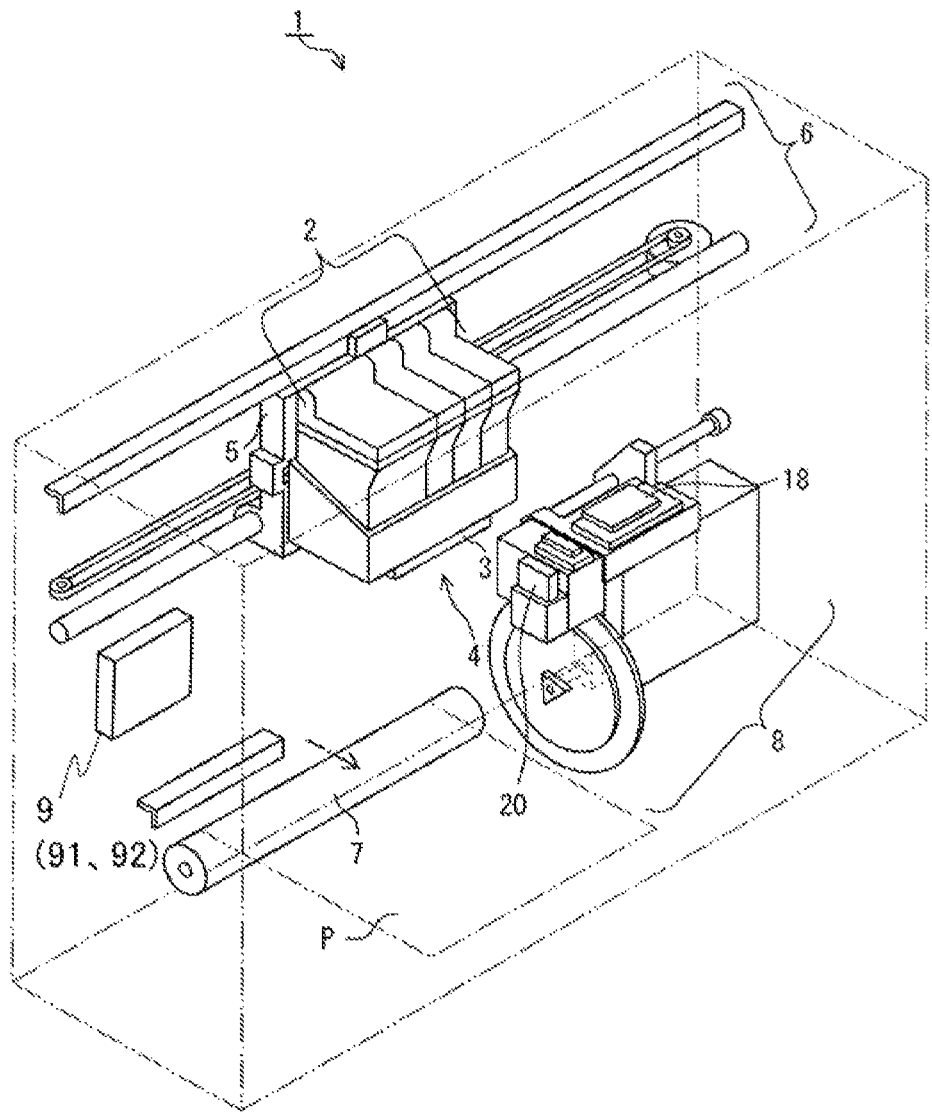

WATER-BASED INK, PRINTED RECORDING MEDIUM, INKJET RECORDING METHOD, INKJET RECORDING DEVICE, AND INK STORAGE CONTAINER

CROSS-REFERENCE TO RELATED APPLICATIONS

The present claims priority to Japanese Patent Application No. 2021-195235, filed Dec. 1, 2021, the entire disclosure of which is incorporated herein by reference.

BACKGROUND OF THE DISCLOSURE

Technical Field

The present disclosure relates to a water-based ink, a printed recording medium, an inkjet recording method, an inkjet recording device, and an ink storage container.

Background Art

One known method to improve the color saturation of materials recorded with water-based ink for inkjet recording includes increasing the colorant concentration in the water-based ink for inkjet recording.

SUMMARY OF THE DISCLOSURE

According to an aspect of the present disclosure, a water-based ink, includes: water; a colorant; and a water-soluble organic solvent. The water-soluble organic solvent includes a penetrating agent and a wetting agent. The penetrating agent includes a compound of formula (1), and the wetting agent comprises a compound of formula (2).

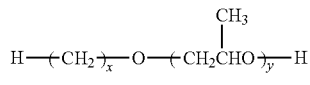  (1)

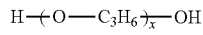  (2)

In formula (1), x is 4 or more, and y is 2 or more, and in formula (2), x is 2 or more.

According to another aspect of the present disclosure, a printed recording medium includes a substrate, and the above-described water-based ink, printed on the substrate.

According to a further aspect of the present disclosure, an inkjet recording method includes ejecting the above-described water-based ink onto a recording medium to record an image on the recording medium.

According to a further aspect of the present disclosure, an inkjet recording device includes the above-described water-based ink, an ink storing unit storing the water-based ink, and an ink ejecting unit capable of ejecting the water-based ink to a recording medium.

According to a further aspect of the present disclosure, an ink storage container, comprising the above-described water-based ink stored therein.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein the FIG. 1 s a perspective view of an exemplary inkjet recording device according to the present disclosure.

DESCRIPTION OF THE EMBODIMENTS

As used herein, the words "a" and "an" and the like carry the meaning of "one or more." When an amount, concentration, or other value or parameter is given as a range, and/or its description includes a list of upper and lower values, this is to be understood as specifically disclosing all integers and fractions within the given range, and all ranges formed from any pair of any upper and lower values, regardless of whether subranges are separately disclosed. Where a range of numerical values is recited herein, unless otherwise stated, the range is intended to include the endpoints thereof, as well as all integers and fractions within the range. As an example, a stated range of 1-10 fully describes and includes the independent subrange 3.4-7.2 as does the following list of values: 1, 4, 6, 10.

Higher concentrations of colorants increase cost and reduce the stability of the water-based ink. In addition, from the viewpoint of global environmental protection, a requirement is to reduce the generation of VOCs (volatile organic compounds).

According to one embodiment of the present disclosure, the water-based ink for inkjet recording contains water, a colorant, and a water-soluble organic solvent; wherein the water-soluble organic solvent contains a penetrating agent and a wetting agent; the penetrating agent contains a compound expressed by the following formula (1); and the wetting agent contains a compound expressed by the following formula (2).

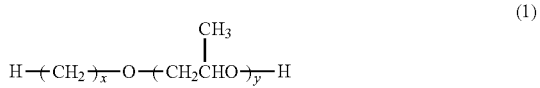  (1)

In formula (1),
x is greater than or equal to 4.
y is greater than or equal to 2.

  (2)

In formula (2),
x is greater than or equal to 2.

By containing c water, a colorant, and a specific water-soluble organic solvent, the water-based ink for inkjet recording of the present disclosure can increase color saturation and reduce VOC generation.

In the present disclosure, the term "mass" may be read as "weight" unless otherwise specified. For example, "mass ratio" may be read as "weight ratio" unless otherwise specified, and "mass %" may be read as "weight %" unless otherwise specified.

In the present disclosure, saturation (C*) is calculated, for example, from a* and b* based on the L*a*b* color system (CIE 1976 (L*a*b*) color system) standardized by the International Commission on Illumination (CIE) in 1976, using the following formula (see JISZ8729).

$$C^* = \{(a^{*2}) + (b^{*2})\}^{1/2}$$

Exemplary embodiments of water-based ink for inkjet recording of the present disclosure (hereinafter referred to as "water-based ink" or "ink") are described below. The water-based ink contains water, a colorant, and a water-soluble organic solvent.

The water may be ion exchanged water, pure water, or the like. The amount of water to be blended in the total amount of water-based ink (water ratio) is determined in accordance with desired ink characteristics and the like. The water ratio may, for example, be the remainder after the other ingredients. The amount of water is, for example, 50.0 to 95.0 mass %, 55.0 to 90.0 mass %, or 60.0 to 80.0 mass %.

The colorant may be either a pigment or a dye. In addition, a mixture of pigments and dyes may be used as the colorant.

The pigment is not particularly limited, and includes, for example, carbon black, inorganic pigments, organic pigments, and the like. Examples of the carbon black include furnace black, lamp black, acetylene black, channel black, and the like. Examples of inorganic pigments include titanium dioxide, iron oxide inorganic pigments, carbon black inorganic pigments, and the like. Examples of the organic pigments include azo pigments such as azo lakes, insoluble azo pigments, and condensed azo pigments, chelated azo pigments; polycyclic pigments such as phthalocyanine pigments, perylene and perinone pigments, anthraquinone pigments, quinacridone pigments, dioxazine pigments, thioindigo pigments, isoindolinone pigments, quinophthalone pigments, and the like; dye lake pigments such as basic dye-type lake pigments and acid dye-type lake pigments; nitro pigments such as nitroso pigments; aniline black daylight fluorescent pigments; and the like. Other pigments can also be used if they can be dispersed in a water-based phase. Specific examples of these pigments include C.I. Pigment Black 1, 6 and 7; C.I. Pigment Yellow 1, 2, 3, 12, 13, 14, 15, 16, 17, 55, 74, 78, 150, 151, 154, 180, 185 and 194; C.I. Pigment Orange 31 and 43; C.I. Pigment Red 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 209, 209 221, 222, 224 and 238; C.I. Pigment Violet 19 and 196; C.I. Pigment Blue 1, 2, 3, 15, 15:1, 15:2, 15:3, 15:4, 16, 22 and 60; C.I. Pigment Green 7 and 36; and solid solutions of these pigments, and the like. The water-based ink of the present disclosure may be produced by dispersing the pigments in water using a dispersing agent. For example, common polymer dispersing agents (resins for pigment dispersion, resin dispersing agents) and the like may be used as the dispersing agent, or they may be prepared in-house. The pigments in the water-based ink of the present disclosure may be encapsulated by polymers.

Pigments may be dispersed using, for example, a dispersing device. Dispersing devices used for dispersion of the pigments are not limited so long as they are general dispersion machines, such as ball mills, roll mills, sand mills (for example, high-speed type), and the like.

The pigment may be a self-dispersing pigment. The self-dispersing pigments include those that can be dispersed in water without the use of a dispersing agent, for example, by introducing at least one hydrophilic functional group such as a carbonyl group, hydroxyl group, carboxylic group, sulfonate group, phosphate group, or the like, or salts thereof, directly or via other groups into the pigment particles by chemical bonds. The self-dispersing pigments can be those where a pigment is treated by the methods described in Japanese Unexamined Patent Application Publication No. H8-3498, Japanese PCT Unexamined Patent Application Publication No. 2000-513396, Japanese PCT Unexamined Patent Application Publication No. 2008-524400, Japanese PCT Unexamined Patent Application Publication No. 2009-515007, Japanese PCT Unexamined Patent Application Publication No. 2011-515535, and the like. The contents of these documents are incorporated herein by reference in their entireties. Both inorganic and organic pigments can be used as raw materials for the self-dispersing pigments. Pigments suitable for the above treatment include, for example, carbon blacks such as MA8 and MA100, manufactured by Mitsubishi Chemical Corporation, and the like. The self-dispersing pigments described above may be commercially available, for example. The above commercial products include, for example, CAB-O-JET (registered trademark) 200, CAB-O-JET (registered trademark) 250C, CAB-O-JET (registered trademark) 260M, CAB-O-JET (registered trademark) 270Y, CAB-O-JET (registered trademark) 300, CAB-O-JET (registered trademark) 400, CAB-O-JET (registered trademark) 450C, CAB-O-JET (registered trademark) 465M, CAB-O-JET (registered trademark) 470Y, manufactured by Cabot Corporation; BONJET (registered trademark) BLACK CW-2 and BONJET (registered trademark) BLACK CW-3, manufactured by Orient Chemical Industries Co., LIOJET (registered trademark) WD BLACK 002C, manufactured by Toyo Ink Co., and the like.

One of the pigments may be used alone or in a combination of two or more pigments. Solid content of the pigment based on a total mass of the water-based ink (pigment solid content) is not particularly limited and can be determined accordingly. The pigment solid content is, for example, 0.1 to 20.0 mass %, 1.0 to 10.0 mass %, or 2.0 to 8.0 mass %. The pigment solid content is the mass of pigment only and does not include the mass of resin dispersants, or the like (i.e., converted by the amount of active ingredients).

The dyes are not particularly limited, and may include, for example, direct dyes, acid dyes, basic dyes, reactive dyes, food dyes, and the like. Specific examples of dyes include C.I. Direct Black, C.I. Direct Blue, C.I. Direct Red, C.I. Direct Yellow, C.I. Direct Orange, C.I. Direct Violet, C.I. Direct Brown, C.I. Direct Green, C.I. Acid Black, C.I. Acid Blue, C.I. Acid Red, C.I. Acid Yellow, C.I. Acid Orange, C.I. Acid Violet, C.I. Basic Black, C.I. Basic Blue, C.I. Basic Red, C.I. Basic Violet, C.I. Reactive Blue, C.I. Reactive Red, C.I. Reactive Yellow, C.I. Food Black, C.I. Food Red, C.I. Food Yellow, and the like. C.I. Direct Black includes, for example, C.I. Direct Black 17, 19, 22, 31, 32, 51, 62, 71, 74, 108, 112, 113, 146, 154, 168, 195, and the like. Examples of C. I. Direct Blue include C. I. Direct Blue 1, 6, 15, 22, 25, 41, 71, 76, 77, 80, 86, 90, 98, 106, 108, 120, 158, 163, 168, 199, 226, and the like. Examples of C.I. Direct Red include C.I. Direct Red 1, 2, 4, 9, 11, 17, 20, 23, 24, 28, 31, 39, 46, 62, 75, 79, 80, 83, 89, 95, 197, 201, 218, 220, 224, 225, 226, 227, 228, 229, 230, and the like. Examples of the C.I. Direct Yellow include C.I. Direct Yellow 8, 11, 12, 24, 26, 27, 28, 33, 39, 44, 50, 58, 85, 86, 87, 88, 89, 98, 100, 110, 132, 142, 173, and the like. Examples of the C.I. Direct Orange include C.I. Direct Orange 34, 39, 44, 46, 60, and the like. Examples of the C.I. Direct Violet include C.I. Direct Violet 47, 48, and the like. Examples of the C.I. Direct Brown include C.I. Direct Brown 109 and the like. Examples of the C.I. Direct Green include C.I. Direct Green 59 and the like. Examples of the C. I. Acid Black include C. I. Acid Black 2, 7, 24, 26, 31, 48, 51, 52, 63, 110, 112, 115, 118, 156, and the like. Examples of the C.I. Acid Blue include C.I. Acid Blue 1, 7, 9, 15, 22, 23, 25, 29, 40, 43, 59, 62, 74, 78, 80, 90, 93, 100, 102, 104, 117, 120, 127, 138, 158, 161, 167, 220, 234, and the like. Examples of the C.I. Acid Red include C.I. Acid Red 1, 6, 8, 9, 13, 14, 18, 26, 27, 32, 35, 37, 42, 51, 52, 80, 83, 85, 87, 89, 92, 94, 106, 114, 115, 133, 134, 145, 158, 180, 198, 249, 256, 265, 289, 315, 317, and the like. Examples of the C.I. Acid Yellow include C.I. Acid Yellow 1, 3, 7, 11, 17, 23, 25, 29, 36, 38, 40, 42, 44, 61, 71, 76, 98, 99, and the like. Examples of the C.I. Acid Orange include C.I. Acid Orange 7, 19, and the like. Examples of the C.I. Acid Violet include C.I. Acid Violet 49 and the like. Examples of the C.I. Basic Black include C.I. Basic Black 2, and the like. Examples of the C.I. Basic Blue include C.I. Basic Blue 1, 3, 5, 7, 9, 24, 25, 26, 28, 29, and the like. Examples of the C.I. Basic Red include C.I. Basic Red 1, 2, 9, 12, 13, 14, 37, and the like. Examples of the C.I. Basic Violet include C.I. Basic Violet 7, 14, 27, and the like. Examples of the C.I. Reactive Blue include C.I. Reactive Blue 4, 5, 7, 13, 14, 15, 18, 19, 21, 26, 27, 29, 32, 38, 40, 44, 100, and the like. Examples of the C.I. Reactive Red include C.I. Reactive Red 7, 12, 13, 15, 17, 20, 23, 24, 31, 42, 45, 46, 59, and the like. Examples of the C.I. Reactive Yellow include C.I. Reactive Yellow 2, 3, 17, 25, 37, 42, and the like. Examples of the C.I. Food Black include C.I. Food Black 1, 2, and the like. Examples of the C.I. Food Red include C.I. Food Red 87, 92, 94, and the like. Examples of the C.I. Food Yellow include C.I. Food Yellow 3, and the like.

One of the dyes may be used alone or in a combination of two or more dyes. The amount of the dye relative to the total mass of the water-based ink is, for example, 0.1 to 10.0 mass %, 0.2 to 8.0 mass %, or 0.3 to 6.0 mass %.

As mentioned above, the water-based ink also contains a water-soluble organic solvent. The water-soluble organic solvent contains at least a penetrating agent and a wetting agent.

The penetrating agents include, for example, alkylene diols, glycol ether compounds, and the like. Examples of the alkylene diols include 1,2-hexanediol, 1,2-heptanediol, 1,3-propanediol, 1,2-butanediol, 1,3-butanediol, 1,4-butanediol, 2,3-butanediol, 3-methyl-1,3-butanediol, 1,2-pentanediol, 1,5-pentanediol, 1,6-hexanediol, 2-methyl-2,4-pentanediol, 3-methyl-1,5-pentanediol, and the like. Examples of the glycol ether compounds include ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n propyl ether, tripropylene glycol-n-butyl ether, and the like. One type of penetrating agent may be used alone or in a combination of two or more types. The penetrating agent may be commercially available, for example.

The water-based ink contains at least a compound expressed by the following formula (1) as a penetrating agent.

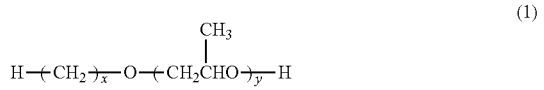

(1)

In the above formula (1), x is not limited, so long as x is greater than or equal to 4. x is preferably 4, for example. In the above formula (1), y is not limited, so long as y is greater than or equal to 2. y is preferably 2 or 3, for example. $(CH_2)_x$ and $(CH_2C(CH_3)HO)_y$ can be linear or branched, but linear is preferred.

Examples of compounds expressed by the above formula (1) include dipropylene glycol-n-butyl ether (BFDG; x=4, y=2), tripropylene glycol-n-butyl ether (TPnB; x=4, y=3), and the like. The compounds expressed by formula (1) may, for example, be commercially available. One type of penetrating agent may be used alone or in a combination of two or more types.

The amount of the compound expressed by formula (1) relative to the total mass of the water-based ink may be, for example, more than 0 mass % and 20 mass % or less, more than 0 mass % and 13 mass % or less, 0.1 mass % or more and 3.0 mass % or less, more than 0.1 mass % and 2.0 mass % or less, 0.3 mass % or more and 2.0 mass or less.

The water-based ink may further contain other penetrating agents (penetrating agents other than the compound expressed by formula (1)) to the extent that the effect described herein is not impaired. Other penetrating agents are not limited, and can be, for example, penetrating agents with a standard boiling point of 250° C. or higher, or, as described below, penetrating agents with a standard boiling point of 250° C. or lower.

When the penetrating agent is a combination of two or more penetrating agents including the compound expressed by formula (1), the amount of the penetrating agent relative to the total mass of the water-based ink can be selected in accordance with the purpose. The amount of the penetrating agent is, for example, more than 0 mass % and 20.0 mass % or less, more than 0 mass % and 13.0 mass % or less, and 0.1 mass % or more, and 3.0 mass % or less.

Examples of the wetting agent include lower alcohols such as methyl alcohol, ethyl alcohol, n-propyl alcohol, isopropyl alcohol, n-butyl alcohol, sec-butyl alcohol and tert-butyl alcohol, and the like; amides such as dimethylformamide, dimethylacetamide, and the like; ketones such as acetone and the like; keto alcohols such as diacetone alcohols and the like; ethers such as tetrahydrofuran, dioxane, and the like; polyhydric alcohols such as polyalkylene glycol, alkylene glycol, and the like; 2-pyrrolidone; N-methyl-2-pyrrolidone; 1,3-dimethyl-2-imidazolidinone, and the like. The polyalkylene glycol is not limited, and examples include polyethylene glycol, polypropylene glycol, and the like. The alkylene glycol is not limited, but examples include ethylene glycol, propylene glycol, butylene glycol, diethylene glycol, triethylene glycol, dipropylene glycol, tripropylene glycol, thiodiglycol, hexylene glycol, and the like. Of these, polyhydric alcohols such as alkylene glycol, and the like are suitable. One type of wetting agent may be used alone, or in a combination of two or more types. The wetting agent may be commercially available, for example.

The water-based ink contains at least one compound expressed by the following formula (2) as a wetting agent. In formula (2), x is greater than or equal to 2.

(2)

Compounds expressed by formula (2) include, for example, tripropylene glycol (TPG; x=3), dipropylene glycol (DPG; x=2), and the like. The compounds expressed by formula (2) may, for example, be commercially available. One type of wetting agent may be used alone, or in a combination of two or more types.

The amount of the compound expressed by formula (2) relative to the total mass of the water-based ink may be, for example, 0.1 to 20.0 mass %, 0.2 to 15.0 mass %, 0.3 to 12.0 mass %, 1.0 to 10.0 mass %, and 3.0 or more and 10.0 mass % or less.

The water-based ink may further contain other wetting agents (wetting agents other than the compound expressed by formula (2)) to the extent that the effect described herein is not impaired. Other wetting agents include, for example, glycerin. The amount of glycerin in the total amount of water-based ink can be appropriately selected in accordance with the purpose.

When the wetting agent is a combination of two or more wetting agents including the compound expressed by formula (2), the amount of the wetting agent relative to the total mass of the water-based ink can be selected in accordance with the purpose. The amount of the wetting agent is, for example, more than 0 mass % and 95.0 mass % or less, 1.0 mass % or more and 80.0 mass % or less, and 3.0 mass % or more and 50.0 mass % or less.

The water-based ink contains the compound expressed by formula (1) as a penetrating agent and the compound expressed by formula (2) as a wetting agent, thereby increasing color saturation and reducing VOC generation. The mechanism that enables both high color saturation and reduced VOC emissions is thought to be as follows. First, the use of highly hydrophobic materials reduces the contact angle to ink droplets after they land. The use of highly hydrophobic materials also decreases the dispersion stability of hydrophilic pigments and makes them more likely to agglomerate in ink droplets at low water evaporation rates. Thereby the colorant will remain on the surface of printing media more easily, which can improve color saturation. Second, the use of solvents with high molecular weight can reduce VOC generation due to lower vapor pressure. However, this mechanism is only a hypothesis, and the present disclosure is not limited thereto.

The water-based inks may, for example, contain penetrating agents and wetting agents with standard boiling points of 250° C. or lower (hereinafter also referred to as low-boiling organic solvents), but preferably are not included. When low-boiling point organic solvents are included, it is preferable that the amount of these solvents be less than or equal to the regulatory standard for VOCs. Herein, the regulatory standards for VOCs conform to the standards established in Germany for obtaining the "Blue Angel Mark". Specifically, for example, for color printing, the VOC emission per unit time (VOC generation) is preferably 18 mg/h or less, and for monochrome printing, the VOC emission per unit time is preferably 10 mg/h or less. The amount of VOCs generated per unit time can be determined, for example, from the total amount of volatile organic compounds released during continuous printing for approximately 5 minutes or longer in a constant-temperature oven (conditions: temperature 23° C., relative humidity 50%).

When a low-boiling-point organic solvent is included, it is preferable to conduct printing with a reduced amount of ink (ejection amount) (ink volume reduced printing). This reduces the amount of the water-based ink used, thereby reducing VOC emissions. On the other hand, if a low-boiling-point organic solvent is not included, VOC emissions are reduced even when printing such that the amount of ink used is not reduced (normal printing).

The water-soluble organic solvent may contain other solvents besides the penetrating agent and wetting agent. Other solvents include, for example, surfactants and the like.

The surfactant is not limited and may be appropriately selected in accordance with the purpose, and, for example, commercially available products may be used. Specifically, the surfactant includes, for example, silicone surfactants, acetylene surfactants, and the like.

Examples of commercially available silicone surfactants include SILFACE (registered trademark) SAG002, SILFACE (registered trademark) SAG005, and SILFACE (registered trademark) SAG503A, and the like, manufactured by Nissin Chemical Industry Co.

Commercial acetylene surfactants include: OLFINE (registered trademark) E1004, OLFINE (registered trademark) E1008, and OLFINE (registered trademark) E1010 manufactured by Nissin Chemical Industry; SURFINOL (registered trademark) 440, SURFINOL (registered trademark) 465, and SURFINOL (registered trademark) 485 manufactured by Air Products and Chemicals, Inc.; ACETYLENOL (registered trademark) E40 and ACETYLENOL (registered trademark) E100 manufactured by Kawaken Fine Chemicals Co., and the like.

The water-based ink may contain other surfactants in addition to or as a substitute for the silicone surfactants and acetylene surfactants. Examples of other surfactants include nonionic surfactants manufactured by Kao Corporation including the EMULGEN (registered trademark) series, RHEODOL (registered trademark) series, EMASOL (registered trademark) series, EXCEL (registered trademark) series, EMANON (registered trademark) series, AMIET (registered trademark) series, and AMINON (registered trademark) series and the like; nonionic surfactants manufactured by Toho Chemical Industries Co. such as Solvon (registered trademark) series and the like; nonionic surfactants manufactured by Lion Corporation such as DOBANOX (registered trademark) series, LEOCOL (registered trademark) series, LEOX (registered trademark) series, LAOL, LEOCOL (registered trademark) series, LIONOL (registered trademark) series, CADENAX (registered trademark) series, LIONON (registered trademark) series, LEOFAT (registered trademark) series, and the like; anionic surfactants manufactured by Kao Corporation such as the EMAL (registered trademark) series, LATEMUL (registered trademark) series, VENOL (registered trademark) series, NEOPELEX (registered trademark) series, NS SOAP, KS SOAP, OS SOAP, PELEX (registered trademark) series, and the like; anionic surfactants manufactured by Lion Corporation such as the LIPOLAN (registered trademark) series, LIPON (registered trademark) series, SUNNOL (registered trademark) series, LIPOTAC (registered trademark) TE, ENAGICOL series, LIPAL (registered trademark) series and LOTAT (registered trademark) series, and the like; and cationic surfactants manufactured by DKS Co. such as CATIOGEN (registered trademark) ES-OW and CATIOGEN (registered trademark) ES-L, and the like.

One type of surfactant may be used alone, or in a combination of two or more types.

The amount of surfactant relative to the total mass of the water-based ink can be appropriately selected in accordance with the purpose. The amount of surfactant is, for example, 0.1 to 5.0 mass %, 0.5 to 3.5 mass %, or 1.0 to 3.0 mass %. Note that the amount of surfactant herein is the sum of the amounts of two or more surfactants.

The water-based ink may also contain conventionally known additives as needed. The additives include, for example, pH adjusting agents, viscosity adjusting agents, surface tension adjusting agents, anti-mold agents, and the like. Examples of the viscosity adjusting agent include polyvinyl alcohol, cellulose, water-soluble resins, and the like.

In embodiments, an ink storage container according to the present disclosure is an ink container that contains water-based ink for inkjet recording, and the water-based ink is the water-based ink for inkjet recording according to the present disclosure. Examples of ink storage containers include ink cartridges, tanks, pouches, and the like. The main body of the ink storage container may be a conventionally known container main body, for example.

Next, inkjet recording devices and inkjet recording methods will be described.

In embodiments, the inkjet recording device of the present disclosure is an inkjet recording device that includes an ink storage container and ink ejecting part, and the ink contained in the ink storage container part is ejected by the ink ejecting part. The water-based ink for inkjet recording of the present disclosure is stored in the ink storage container.

The FIGURE illustrates an exemplary configuration of an inkjet recording device of the present disclosure. As illustrated in the drawing, an inkjet recording device 1 includes four ink storage containers (ink cartridge 2), an ink ejecting part (inkjet head) 3, a head unit 4, a carriage 5, a drive unit 6, a platen roller 7, and a purging device 8 as major components. The inkjet recording device may optionally include a controlling part 9 (CPU, GPU, and the like) as an optional configuration.

The four ink cartridges 2 contain four colors of water-based ink, one each of yellow, magenta, cyan, and black. For example, at least one of the four water-based inks is the water-based ink of the present disclosure. The FIGURE shows a set of four ink cartridges 2, but instead, an integrated ink cartridge may be used, having the interior partitioned to form a water-based yellow ink storage container, a water-based magenta ink storage container, a water-based cyan ink storage container, and a water-based black ink storage container. The main body of the ink cartridge may be a conventionally known cartridge main body, for example.

The inkjet head 3 installed in the head unit 4 records on a recording medium (for example, recording paper) P. The four ink cartridges 2 and the head unit 4 are mounted on the carriage 5. The drive unit 6 moves the carriage 5 back and forth in a straight line direction. The drive unit 6 may be any conventionally known drive unit, for example (see, for example, Japanese Unexamined Patent Application Publication No. 2008-246821). The contents of this document are incorporated herein by reference in their entireties. The platen roller 7 extends in a reciprocating direction of carriage 5 and is disposed opposite the inkjet head 3.

The controlling part 9 is responsible for the overall control of the inkjet recording device. In the inkjet recording device, various programs are executed by the controlling part 9, for example, and various information is read and written. The controlling part 9 functions, for example, as a determining part 91 and an image processing part 92.

The determining part 91 determines whether the condition of the inkjet recording device meets specific conditions. The specific conditions are not limited, but for example, the controlling part 9 determines that a specific condition is satisfied when at least one of the following is indicated: the supply of ink from the ink storage container to the inkjet head 3 may be delayed; the user has given instructions to reduce the amount of ink; the amount of ink remaining is low; or a large amount of ink is used when printing based on the received image data. For example, the determining part 91 determines the ejecting mode to be either the first ejecting mode or the second ejecting mode (third or fourth ejecting mode), as described below, according to the above determination, and drives the inkjet head 3 to eject the water-based ink to perform the inkjet recording operation.

The image processing part 92 performs image processing on the received image data. The image processing part 92 reduces the amount of water-based ink ejected in the second ejecting mode from the amount of water-based ink ejected in the first ejecting mode by changing the parameters of image processing of the first ejecting mode.

Image processing of the received image data in the image processing part 92 is described below. When image data is received, the inkjet recording device 1 performs image processing including color conversion processing, color tone adjustment processing, ink volume regulation processing, halftone processing, interlace processing, and the like. Color conversion processing, for example, is a process of converting image data, which is RGB pixel data containing bitmap data, is converted into CMYK pixel data expressing the pixel color by the gradation values (for example, 256 gradations) of the four elements of ink colors used for the recording, such as cyan (C), magenta (M), yellow (Y), and black (K). The above conversion is performed, for example, using a look-up table that maps RGB pixel data to CMYK pixel data. The color tone adjustment processing is, for example, a process of performing calibration processing. The calibration processing corrects the value of each element of CMYK pixel data such that the density of the color actually recorded on the recording medium changes linearly with the change in the value of each element of CMYK pixel data before color correction processing. Calibration can reduce the difference in color density due to the above mentioned characteristics. The ink volume adjustment process is, for example, a process to adjust the value of each element of each corrected CMYK pixel data such that the ejection volume (also called ink volume) of the water-based ink required for recording is less than the standard volume. The halftone processing is performed using known methods, such as dither and error diffusion methods and the like, for example. The interlace processing is, for example, a process of setting an interlacing method to be performed by the inkjet recording device.

The inkjet head 3 may, for example, select either the "first ejecting mode" or the "second ejecting mode" with respect to the ejecting operation of the water-based ink to perform recording. When the second ejecting mode is selected, the inkjet head 3 may, for example, select either the "third ejecting mode" or the "fourth ejecting mode" to perform recording. Specifically, when the determining part 91 determines that specific conditions are not satisfied, the inkjet head 3 receives a command from the controlling part 9 to perform the recording in the first ejecting mode, in which the inkjet head 3 ejects the water-based ink for inkjet recording based on the received image data. The first ejecting mode is also referred to as, for example, normal printing mode. On the other hand, if the determining part 91 determines that the specific conditions are satisfied, the inkjet head 3 receives a command from the controlling part 9 and executes the recording in the second ejecting mode. The second ejecting mode is a mode in which the ejection volume of the water-based ink for inkjet recording is reduced, as compared to the first ejecting mode. In other words, when the same image data is received, the amount of ink used for ejecting in the second ejecting mode is less than the amount of ink used for ejecting in the first ejecting mode.

The second ejecting mode may include at least one of a third and fourth ejecting modes. The inkjet head 3 performs the recording in at least one of the third and fourth ejecting modes, for example, based on user selection.

The third ejecting mode is a mode in which the recording duty in the first ejecting mode is changed to eject water-based ink, for example, and is also referred to as duty changing mode. Changing the recording duty is performed by changing a dot size of at least a portion of dots formed by the water-based ink for inkjet recording that lands on a recording medium in the first ejecting mode. Changing the recording duty in the second ejecting mode will be described in more detail. The droplets ejected by the inkjet head 3 land on the recording medium. The inkjet head 3 may, for example, eject a plurality of droplets in succession at the same point on the recording medium. The dot size of the droplets that land on the recording medium can be classified, for example, into S size, M size, and L size, depending on the size. The classification criteria for each size are not limited and can be set arbitrarily. The dot size can be measured, for example, using known methods. The recording duty can be adjusted by the ratio of the dot size, for example, the ratio of S-size, M-size, and L-size droplets. The dot size and the ratio can be changed, for example, by changing the halftone processing parameters as the image processing parameters. If at least a portion of the dot sizes change as described above, the ratios will change, and the recording duty will also change. Thus, in the third ejecting mode, the dot size is changed, and the recording duty is adjusted to enable printing with reduced ink volume.

The fourth ejecting mode is a mode in which the ejection volume of the water-based ink for inkjet recording in the first ejecting mode is changed by changing the characteristics inherent in the inkjet recording device 1. The fourth ejecting mode is also referred to as ink saving printing mode or high-speed mode, for example. In the fourth ejecting mode, a reduction of the ejection volume of water-based ink is possible, for example, by changing the parameters of the color tone adjustment processing (for example, the parameters of the calibration processing, which are characteristic values unique to the inkjet recording device) as parameters of the image processing. The characteristic value is unique to each individual inkjet recording device, and changing this characteristic value can change the printed color tone, and the like. The characteristic values are, for example, stored in advance in the inkjet recording device. Other characteristic values include, for example, head characteristic values. The head characteristic value is a value based on the mechanical misalignment and ejection variation (for example, variation in ejection rate and direction) of a plurality of ink ejection ports provided on the inkjet head 3. If there is mechanical misalignment or ejection variation in a plurality of ink ejection ports, the effect of such misalignment or variation may appear in the printing results. Thus, in the fourth ejecting mode, the amount of water-based ink ejected is changed during the calibration processing to enable printing with reduced ink volume.

The water-based inks in the first ejecting mode, second ejecting mode, third ejecting mode and fourth ejecting mode are all water-based inks for inkjet recording of the present disclosure. The inkjet head 3 capable of executing the first, second, third, and fourth ejecting modes can, for example, be a conventionally known head (see, for example, Japanese Unexamined Patent Application Publication No. 2002-36599, Japanese Unexamined Patent Application Publication No. 2020-044679, and Japanese Unexamined Patent Application Publication No. 2020-131576). The contents of these documents are incorporated herein by reference in their entireties. Thereby, ink volume reduction printing is possible (recording in the second ejecting mode (third and fourth ejecting modes)).

The purging device 8 suctions out defective ink containing air bubbles and the like that accumulate inside the inkjet head 3. For example, a conventionally known purging device can be used as the purging device 8 (see, for example, Japanese Unexamined Patent Application Publication No. 2008-246821).

A wiper member 20 is provided on the platen roller 7 side of the purging device 8, adjacent to the purging device 8. The wiper member 20 is formed in the shape of a spatula, and wipes a nozzle forming surface of the inkjet head 3 as the carriage 5 moves. In the FIGURE, a cap 18 covers a plurality of nozzles of the inkjet head 3 when the head has returned to the reset position after recording is finished, in order to prevent the water-based ink from drying out.

In the inkjet recording device 1 shown in the FIGURE, the four ink cartridges 2 are mounted on one carriage 5 together with the head unit 4. However, the present disclosure is not limited thereto. In the inkjet recording device 1, each of the four ink cartridges 2 may be mounted on a carriage separate from the head unit 4. Each of the four ink cartridges 2 may be provided and secured in the inkjet recording device 1, rather than being mounted on the carriage 5. In these embodiments, for example, each of the four ink cartridges 2 and the head unit 4 mounted on the carriage 5 are connected by tubing or the like, and the water-based ink is supplied from each of the four ink cartridges 2 to the head unit 4. Furthermore, in these embodiments, four ink bottles in bottle form may be used instead of the four ink cartridges 2. In this case, it is preferable that the ink bottle has an injection port for injection ink from the outside into the inside.

Inkjet recording using this inkjet recording device 1 is performed, for example, as follows. First, the recording paper P is fed from a paper feeding cassette (not illustrated) provided on the side or below the inkjet recording device 1. The recording paper P is introduced between the inkjet head 3 and the platen roller 7. Predetermined recording is performed on the introduced recording paper P by the water-based ink ejected from the inkjet head 3. Ejecting may be performed, for example, by the "first ejecting mode" or the "second ejecting mode (at least one of the third or fourth ejecting modes)," depending on the determination of the determining part 91, as described above. After recording, the recording paper P is ejected from the inkjet recording device 1. In the FIGURE, paper feeding and paper ejecting mechanisms for the recording paper P are omitted.

The device illustrated in the FIGURE uses a serial inkjet head, but the present disclosure is not limited thereto. The inkjet recording device may be a line inkjet head or a roller-to-roller device.

In embodiments, the inkjet recording method of the present disclosure is an inkjet recording method that includes a recording step in which water-based ink is ejected onto the recording medium by an inkjet method, and in the recording step, the water-based ink for inkjet recording of the present disclosure is used as the water-based ink. The inkjet recording method of the present disclosure can be performed, for example, using the inkjet recording device of the present disclosure. The recording includes printing, text printing, image printing, and the like.

The inkjet recording method of the present disclosure may include, for example, a determining step and an image processing step as optional components. The determining step determines whether the condition of the inkjet recording device meets specific conditions. The image processing step performs image processing of the received image data. The determining step can be performed, for example, by the determining part 91, and the image processing step can be performed, for example, by the image processing part 92.

If a determination is made, the recording step may, for example, select either the "first ejecting mode" or the "second ejecting mode" and perform recording. If the second ejecting mode is selected, the recording step may, for example, select either the "third ejecting mode" or the "fourth ejecting mode" to perform recording. The first ejecting mode, second ejecting mode, third ejecting mode, and fourth ejecting mode are the same as described above. Specifically, when it is determined that the specific conditions are not met in the determining process, the inkjet head 3 receives a command from the controlling part 9 and performs recording in the first ejecting mode based on the received image data. On the other hand, if it is determined in the determining step that the specific conditions are satisfied, the inkjet head 3 receives a command from the controlling part 9 and performs the recording in the second ejecting mode. In the second ejecting mode, for example, at least one of the third ejecting mode and the fourth ejecting mode is selected by the user. The inkjet head 3 then performs the recording in the selected mode, for example. The water-based inks in the first ejecting mode, second ejecting mode, third ejecting mode and fourth ejecting mode are all water-based inks for inkjet recording of the present disclosure.

EXAMPLES

Examples according to the present disclosure, together with comparative examples, are described below. The inventions(s) described herein are not intended to be limited or restricted by the examples and comparative examples.

Examples 1 to 10 and Comparative Examples 1 to 5

The components of the water-based ink compositions shown in Table 1 below, except for the pigment, were uniformly mixed to obtain an ink solvent. Next, the ink solvent was added to the pigment and mixed uniformly. The resulting mixture was then filtered through a cellulose acetate-type membrane filter (pore diameter: 3.00 μm) manufactured by Toyo Roshi Kaisha to obtain water-based ink for inkjet recording of Examples 1 to 9 and Comparative Examples 1 to 5.

For the water-based inks of Examples 1 to 10 and Comparative Examples 1 to 5, (a) saturation evaluation and (b) VOC generation evaluation were conducted by the following methods.

(a) Saturation Evaluation

Images were recorded on a recording medium ("Multi Paper Super White+" manufactured by ASKUL) using an inkjet recording device MFC-J6580CDW manufactured by Brother Industries, Ltd at 100% recording duty and the water-based inks of Examples 1 to 9 and Comparative Examples 1 to 5. The saturation ($C^*$) at five locations on each image was measured using an XRite-939 spectrophotometer (light source: D65, viewing angle: 10°, ANSI-T) manufactured by X-Rite, and the average value was obtained. The difference in the saturation ($C^*$) was then calculated by subtracting the saturation ($C^*$) in Comparative Example 1, which used the water-based magenta ink (C.I. Pigment Red 122), but did not use a penetrating agent containing the compound expressed by formula (1) to produce the image, from the saturation ($C^*$) in Examples 1 to 6, 9 and 10, and Comparative Examples 2 and 3. In the same manner, the difference in saturation ($C^*$) was calculated by subtracting the saturation ($C^*$) in Comparative Example 4, which used a water-based yellow ink (C.I. Pigment Yellow 74), but did not use a penetrating agent containing a compound expressed by Formula (1) to produce the image, from the saturation ($C^*$) in Example 7; and the difference in saturation ($C^*$) was calculated by subtracting the saturation ($C^*$) in Comparative Example 5, which used the water-based cyan ink (C.I. Pigment Blue 15:3), but did not use a penetrating agent containing the compound expressed in Formula (1) to produce the image, from the saturation ($C^*$) in Example 8. Magenta saturation, yellow saturation, and cyan saturation were then evaluated according to the following evaluation criteria. —Saturation Evaluation Criteria—

A: The difference in color saturation ($C^*$) was +4 or higher.

B: The difference in color saturation ($C^*$) was +2 or higher and less than +4.

C: The difference in color saturation ($C^*$) was less than +2.

(b) Evaluation of VOC Generation

The degree of VOC generation was evaluated for each penetrating agent and each wetting agent in the water-based inks of the examples and comparative examples in accordance with the following evaluation criteria.

—VOC Generation Evaluation Criteria—

A: The boiling point of all penetrating agents and wetting agents in the water-based ink exceeds 250° C.

B: The boiling point of at least one penetrating agent or wetting agent in the water-based ink was 210° C. or higher and 250° C. or lower.

C: The boiling point of at least one penetrating agent or wetting agent in the water-based ink was less than 210° C.

The water-based ink compositions and evaluation results of the water-based inks of Examples 1 to 10 and Comparative Examples 1 to 5 are shown in Table 1.

TABLE 1

|  |  |  | Examples | | | | | | | |
|---|---|---|---|---|---|---|---|---|---|---|
|  |  |  | 1 | 2 | 3 | 4 | 5 | 6 | 7 | 8 |
| Water-based ink composition (mass %) | Colorant | C.I. Acid Red PR122 | 4.5 | 4.5 | 4.5 | 4.5 | 4.5 | 4.5 | — | — |
|  |  | C.I. Pigment Yellow 74 | — | — | — | — | — | — | 4.5 | — |
|  |  | C.I. Pigment Blue 15:3 | — | — | — | — | — | — | — | 4.5 |
|  | Penetrating agent | Tripropylene glycol-n-butyl ether | 0.1 | — | 0.5 | 0.1 | 0.5 | 0.1 | 0.1 | 0.1 |
|  |  | Dipropylene glycol-n-butyl ether | — | 0.1 | — | — | — | — | — | — |

TABLE 1-continued

| | | | | | | | | | | |
|---|---|---|---|---|---|---|---|---|---|---|
| | | Dipropylene glycol-n-propyl ether | — | — | — | — | — | — | — | — |
| | | Triethylene glycol monobutyl ether | — | — | — | — | — | — | — | — |
| | Wetting agent | Glycerin (86%) | 14.0 | 14.0 | 14.0 | 14.0 | 14.0 | 14.0 | 14.0 | 14.0 |
| | | Tripropylene glycol | 1.0 | 1.0 | 1.0 | 5.0 | 5.0 | — | 1.0 | 1.0 |
| | | Dipropylene glycol | — | — | — | — | — | 1.0 | — | — |
| | | Triethylene glycol | — | — | — | — | — | — | — | — |
| | Surfactant | SUNNOL (Registered trademark) NL-1430 (*1) | 1.0 | 1.0 | 1.0 | 1.0 | 1.0 | 1.0 | 1.0 | 1.0 |
| | | OLFINE (Registered trademark) E1004 (*2) | 0.2 | 0.2 | 0.2 | 0.2 | 0.2 | 0.2 | 0.2 | 0.2 |
| | | Silface (Registered trademark) SAG002 (*3) | — | — | — | — | — | — | — | — |
| | | Silface (Registered trademark) SAG503A (*4) | — | — | — | — | — | — | — | — |
| | Fixing resin | Joncryl (Registered trademark) 70 (*5) | 0.48 | 0.48 | 0.48 | 0.48 | 0.48 | 0.48 | 0.48 | 0.48 |
| | pH adjusting agent | Triethanolamine | 0.1 | 0.1 | 0.1 | 0.1 | 0.1 | 0.1 | 0.1 | 0.1 |
| | Anti-mold agent | PROXEL GXL(S)(*6) | 0.1 | 0.1 | 0.1 | 0.1 | 0.1 | 0.1 | 0.1 | 0.1 |
| | Water | | Remainder | Remainder | Remainder | Remainder | Remainder | Remainder | Remainder | Remainder |
| Saturation during normal printing (C*) | | | B | B | B | B | A | B | B | B |
| Evaluation of VOC generation | | | A | B | A | A | A | B | A | A |

| | | | Examples | | Comparative Examples | | | | |
|---|---|---|---|---|---|---|---|---|---|
| | | | 9 | 10 | 1 | 2 | 3 | 4 | 5 |
| Water-based ink composition (mass %) | Colorant | C.I. Acid Red PR122 | 4.5 | 4.5 | 4.5 | 4.5 | 4.5 | — | — |
| | | C.I. Pigment Yellow 74 | — | — | — | — | — | 4.5 | — |
| | | C.I. Pigment Blue 15:3 | — | — | — | — | — | — | 4.5 |
| | Penetrating agent | Tripropylene glycol-n-butyl ether | 0.5 | 0.5 | — | 0.1 | — | — | — |
| | | Dipropylene glycol-n-butyl ether | — | — | — | — | — | — | — |
| | | Dipropylene glycol-n-propyl ether | — | — | — | — | 0.1 | — | — |
| | | Triethylene glycol monobutyl ether | — | — | 0.1 | — | — | 0.1 | 0.1 |
| | Wetting agent | Glycerin (86%) | 14.0 | 14.0 | 14.0 | 14.0 | 14.0 | 14.0 | 14.0 |
| | | Tripropylene glycol | 5.0 | 5.0 | 1.0 | — | 1.0 | 1.0 | 1.0 |
| | | Dipropylene glycol | — | — | — | — | — | — | — |
| | | Triethylene glycol | — | — | — | 1.0 | — | — | — |
| | Surfactant | SUNNOL (Registered trademark) NL-1430 (*1) | 1.0 | 1.0 | 1.0 | 1.0 | 1.0 | 1.0 | 1.0 |
| | | OLFINE (Registered trademark) E1004 (*2) | — | — | 0.2 | 0.2 | 0.2 | 0.2 | 0.2 |
| | | Silface (Registered trademark) SAG002 (*3) | 0.2 | — | — | — | — | — | — |
| | | Silface (Registered trademark) SAG503A (*4) | — | 0.2 | — | — | — | — | — |
| | Fixing resin | Joncryl (Registered trademark) 70 (*5) | 0.48 | 0.48 | 0.48 | 0.48 | 0.48 | 0.48 | 0.48 |
| | pH adjusting agent | Triethanolamine | 0.1 | 0.1 | 0.1 | 0.1 | 0.1 | 0.1 | 0.1 |
| | Anti-mold agent | PROXEL GXL(S)(*6) | 0.1 | 0.1 | 0.1 | 0.1 | 0.1 | 0.1 | 0.1 |
| | Water | | Remainder | Remainder | Remainder | Remainder | Remainder | Remainder | Remainder |
| Saturation during normal printing (C*) | | | A | A | — | C | B | — | — |
| Evaluation of VOC generation | | | A | A | A | A | C | A | A |

(*1): Anionic surfactant: Lion Corporation: Numbers in the table indicate blended amounts.
(*2): Acetylene glycol surfactant: Nissin Chemical Industry Co.: Numbers in the table indicate blended amounts.
(*3): Silicone-based surfactant: Nissin Chemical Industry Co.: Numbers in the table indicate blended amounts.
(*4): Silicone-based surfactant: Nissin Chemical Industry Co.: Numbers in the table indicate blended amounts.
(*5): Acryl styrene resin: BASF (formerly Johnson Polymer Co., Ltd.): Numbers in the table indicate blended amounts.
(*6)Arch Chemicals, Inc.

As shown in Table 1, the evaluation results for saturation (C*) were favorable, with a score of "B" or better in Examples 1 to 10. In addition, the VOC generation scores for Examples 1 to 9 were favorable, with a score of "B" or better. The VOC generation evaluation results were superior for Example 1, in which tripropylene glycol-n-butyl ether (x=4, y=3) was used as the compound expressed by Formula (1), and tripropylene glycol (x=3) was used as the compound expressed by Formula (2), compared with either Example 2 in which dipropylene glycol-n-butyl ether (x=4, y=2) was used as the compound expressed by Formula (1) or to Example 6 in which dipropylene glycol (x=2) was used as the compound expressed by Formula (2). Example 5, in which the amount of the compound expressed by Formula (1) is 0.3 mass % or more and 2.0 mass % or less and the amount of the compound expressed by Formula (2) is 3.0 mass % or more and 10.0 mass % or less, had superior saturation (C*) evaluation results, compared with Examples 1, 3, and 4 under the same conditions except that the amounts of at least one of the compounds expressed by Formula (1) or Formula (2) differ.

On the other hand, Comparative Examples 1, 4, and 5, in which triethylene glycol monobutyl ether was used instead of the compound expressed by formula (1), yielded evaluation results for saturation (C*) that was inferior, compared with Examples 1 to 10. Comparative Example 2, which did not use the compound expressed by formula (2), yielded evaluation results for saturation (C*) that was inferior. Comparative Example 3, in which dipropylene glycol-n-propyl ether was used instead of the compound expressed by formula (1), yielded evaluation results for VOC generation that was inferior.

Next, (c) the image quality evaluation with reduced ink volume printing using the water-based inks in Examples 1, 3, 4, 5, and Comparative Example 1 was performed by the following method.

(c) Image Quality Evaluation with Reduced Ink Volume Printing

Evaluation samples for each Examples 1, 3, 4, 5 and Comparative Example 1 were prepared by recording images on plain paper ("Multi Paper Super White+" by ASKUL) using an MFC-J6580CDW inkjet recording device manufactured by Brother Industries, Ltd. and ejecting respective water-based inks in printing modes 1 to 6 as described below. The saturation (C*) at five locations on the image of each evaluation sample was measured using an XRite-939 spectrophotometer (light source: D65, viewing angle: 10°, ANSI-T) manufactured by X-Rite, and the average value was obtained. A higher color saturation (C*) leads to superior image quality.

The six printing modes were as follows. In the following, using printing mode 1 as a reference, printing mode 1 corresponded to a normal printing mode (first ejecting mode), printing modes 2 and 3 corresponded to duty changing modes (third ejecting mode), printing mode 4 corresponded to an ink saving printing mode (fourth ejecting mode), and printing modes 5 and 6 corresponded to a combination of duty changing mode (third ejecting mode) and ink saving mode (fourth ejecting mode). These printing modes can be performed by changing the settings in the inkjet printer as described above. Specifically, printing mode 1 was a mode set to print without selecting a mode on the inkjet printer (mode not selected) and at 100% recording duty. The printing modes 2 and 3 were similar to printing mode 1, except that the recording duty setting was changed. The printing mode 4 was a mode where "high speed mode" on the inkjet printer was selected, and the recording duty was set to 100% recording duty. The printing modes 5 and 6 were similar to printing mode 4, except that the recording duty setting was changed. The "high-speed mode" was a mode in which the characteristic values of the inkjet printer were changed to print with a reduced amount of water-based ink compared with the amount of water-based ink ejected in the non-selected mode, without changing the recording duty.

Printing mode 1: Recording Duty 100%, mode not selected
Printing mode 2: Recording Duty 70%, mode not selected
Printing mode 3: Recording Duty 40%, mode not selected
Printing mode 4: Recording Duty 100%, high speed mode
Printing mode 5: Recording Duty 70%, high speed mode
Printing mode 6: Recording Duty 40%, high speed mode Evaluation results for the water-based inks of Examples 1, 3, 4, 5, and Comparative Example 1 are shown in Tables 2 and 3. The water-based ink composition of each of the water-based inks of Examples 1, 3, 4, 5, and Comparative Example 1 is the same as the ink composition shown in Table 1, and thus is omitted In Tables 2 and 3.

TABLE 2

| | Examples | | | | | | | | | | | | | | | | | | | | | | | | |
|---|---|---|---|---|---|---|---|---|---|---|---|---|---|---|---|---|---|---|---|---|---|---|---|---|---|
| | 1 | | | | | | 3 | | | | | | 4 | | | | | | 5 | | | | | | |
| Printing mode | 1 | 2 | 3 | 4 | 5 | 6 | 1 | 2 | 3 | 4 | 5 | 6 | 1 | 2 | 3 | 4 | 5 | 6 | 1 | 2 | 3 | 4 | 5 | 6 |
| Saturation (C*) | 52 | 43 | 27 | 49 | 41 | 29 | 52 | 43 | 27 | 51 | 43 | 30 | 52 | 42 | 27 | 50 | 42 | 30 | 53 | 44 | 28 | 51 | 42 | 30 |

TABLE 3

| | Comparative Examples 1 | | | | | |
|---|---|---|---|---|---|---|
| Printing mode | 1 | 2 | 3 | 4 | 5 | 6 |
| Saturation (C*) | 50 | 40 | 25 | 48 | 39 | 28 |

As shown in Tables 2 and 3, Examples 1, 3, 4, and 5 exhibited higher saturation (C*) compared with Comparative Example 1 in the same printing mode even when the ejection amount was reduced by changing least one of the recording duty or the unique value. In other words, when the water-based ink of Examples 1, 3, 4, and 5 is used, there was less deterioration of image quality than when the water-based ink of Comparative Example 1 was used. From these results, it is clear that the water-based ink of Examples 1, 3, 4, and 5 can reduce the ejection amount of the water-based ink without impairing the image quality, as compared to the water-based ink of Comparative Example 1, and thus the amount of VOC generated can be reduced. Further, even when thin-out printing is performed, high-quality recording appears possible using the water-based inks of Examples 1, 3, 4, and 5, as compared to the water-based ink of Comparative Example 1.

As shown above, the water-based ink of the present disclosure can provide excellent saturation and can reduce VOC generation. The water-based inks of the present disclosure are widely applicable to inkjet recording on various recording media.

Obviously, numerous modifications and variations of the present invention(s) are possible in light of the above teachings. It is therefore to be understood that within the scope of the appended claims, the invention(s) may be practiced otherwise than as specifically described herein.

The invention claimed is:

1. A water-based ink, comprising:
water;
a colorant; and
a water-soluble organic solvent,
wherein:
the water-soluble organic solvent comprises a penetrating agent and a wetting agent;
the penetrating agent comprises a compound of formula (1); and
the wetting agent comprises a compound of formula (2):

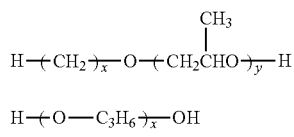

wherein, in formula (1), x is 4 or more, and y is 2 or more, and in formula (2), x is 2 or more.

2. The water-based ink according to claim 1, wherein an amount of the compound of formula (1) relative to a total mass of the water-based ink is 0.1 to 2.0 mass %.

3. The water-based ink according to claim 1, wherein an amount of the compound of formula (2) relative to a total mass of the water-based ink is 1.0 to 10.0 mass %.

4. The water-based ink according to claim 1, wherein, in formula (1), y is 3 or more, and in formula (2), x is 3 or more.

5. The water-based ink according to claim 1, wherein an amount of the compound of formula (1) relative to a total mass of the water-based ink is 0.3 to 2.0 mass %, and an amount of the compound of formula (2) relative to a total mass of the water-based ink is 3.0 to 10.0 mass %.

6. The water-based ink according to claim 1, wherein the water-based ink is suitable for an inkjet recording on a recording medium.

7. A printed recording medium, comprising:
a substrate; and
the water-based ink according to claim 1, printed on the substrate.

8. An inkjet recording method, comprising:
ejecting the water-based ink according to claim 1 onto a recording medium to record an image on the recording medium.

9. The inkjet recording method according to claim 8, further comprising:
determining whether a specific condition is satisfied or not, wherein:
when the specific condition is determined as being not satisfied, a first ejecting mode in which the water-based ink is ejected based on image data, is performed to record the image; and
when the specific condition is determined as being satisfied, a second ejecting mode in which an amount of the water-based ink ejected is reduced as compared with an amount of the first ejecting mode, is performed to record the image.

10. The inkjet recording method according to claim 9, further comprising:
performing, on the image data, image processing based on a parameter for the image processing, wherein in the second ejecting mode, the parameter for the image processing is changed from the parameter for the image processing in the first ejecting mode such that the amount of the water-based ink ejected in the second ejecting mode is reduced compared with the amount of the water-based ink ejected in the first ejecting mode.

11. The inkjet recording method according to claim 10, wherein the second ejecting mode comprises at least one of a third ejecting mode and a fourth ejecting mode, in the third ejecting mode, the amount of the water-based ink ejected is reduced from the first ejecting mode by changing at least a portion of a dot size from a dot size in the first ejecting mode, thereby changing a recording duty, and in the fourth ejecting mode, the amount of the water-based ink ejected is reduced from the first ejecting mode by changing a characteristic inherent in an inkjet recording device.

12. The inkjet recording method according to claim 11, wherein in the third ejecting mode, a parameter for the image processing comprises a parameter for halftone processing, and the parameter for the halftone processing is changed, and in the fourth ejecting mode, the parameter for the image processing comprises a parameter for color tone adjustment processing, and the parameter for the color tone adjustment processing is changed.

13. An inkjet recording device, comprising:
the water-based ink according to claim 1;
an ink storing unit storing the water-based ink; and
an ink ejecting unit capable of ejecting the water-based ink to a recording medium.

14. The inkjet recording device according to claim 13, further comprising: a determining unit determining whether a specific condition is satisfied or not, wherein: when the specific condition is determined as being not satisfied, a first ejecting mode in which the water-based ink is ejected based on image data, is performed to record the image; and when the specific condition is determined as being satisfied, a second ejecting mode in which an amount of the water-based ink ejected is reduced as compared with an amount of the first ejecting mode, is performed to record the image.

15. The inkjet recording device according to claim 14, further comprising: an image processing unit that performs image processing, on the image data, based on a parameter for the image processing, wherein in the second ejecting mode, the parameter for the image processing is changed from the parameter for the image processing in the first ejecting mode such that the amount of the water-based ink ejected in the second ejecting mode is reduced compared with the amount of the water-based ink ejected in the first ejecting mode.

16. The inkjet recording device according to claim 15, wherein the second ejecting mode comprises at least one of a third ejecting mode and a fourth ejecting mode, in the third ejecting mode, the amount of the water-based ink ejected is reduced from the first ejecting mode by changing at least a portion of a dot size from a dot size in the first ejecting mode, thereby changing a recording duty, and in the fourth ejecting mode, the amount of the water-based ink ejected is reduced from the first ejecting mode by changing a characteristic inherent in the inkjet recording device.

17. The inkjet recording device according to claim 16, wherein in the third ejecting mode, a parameter for the image processing comprises a parameter for halftone processing, and the parameter for the halftone processing is changed, and in the fourth ejecting mode, the parameter for the image processing comprises a parameter for color tone adjustment processing, and the parameter for the color tone adjustment processing is changed.

18. An ink storage container, comprising the water-based ink according to claim 1 stored therein.

* * * * *